(12) United States Patent
Katou et al.

(10) Patent No.: US 8,358,124 B2
(45) Date of Patent: Jan. 22, 2013

(54) MAGNETIC ABSOLUTE ENCODER

(75) Inventors: Shigeharu Katou, Nagano (JP); Kazuhiro Makiuchi, Nagano (JP); Shoji Ito, Nagano (JP); Tooru Miyajima, Nagano (JP); Tomohito Yamazaki, Nagano (JP); Toshiaki Ayuzawa, Nagano (JP); Masato Matsuda, Nagano (JP)

(73) Assignee: Sayno Denki Co., Ltd., Tokyo (JP)

( * ) Notice: Subject to any disclaimer, the term of this patent is extended or adjusted under 35 U.S.C. 154(b) by 286 days.

(21) Appl. No.: 12/948,158

(22) Filed: Nov. 17, 2010

(65) Prior Publication Data
US 2011/0115481 A1 May 19, 2011

(30) Foreign Application Priority Data
Nov. 19, 2009 (JP) ................... 2009-264316

(51) Int. Cl.
*G01B 7/30* (2006.01)
(52) U.S. Cl. ............... 324/207.25; 324/207.23; 324/200
(58) Field of Classification Search ........................ None
See application file for complete search history.

(56) References Cited

U.S. PATENT DOCUMENTS

| 6,452,381 B1 | 9/2002 | Nakatani et al. |
| 7,471,080 B2 | 12/2008 | Sasaki et al. |
| 7,830,109 B2 * | 11/2010 | Sasaki et al. .................. 318/687 |
| 7,923,993 B2 * | 4/2011 | Takahashi et al. ........ 324/207.25 |

* cited by examiner

Primary Examiner — Melissa Koval
Assistant Examiner — Trung Nguyen
(74) Attorney, Agent, or Firm — Rankin, Hill & Clark LLP

(57) ABSTRACT

A magnetic absolute encoder with enhanced resolution is provided. A first cycle determining section 27 utilizes data stored in a fourth angle data storing section 23 to determine in which cycle of m cycles of the fourth angle data, fifth angle data, which has been newly computed in response to rotation of a rotary shaft 1, occurs. A second cycle determining section 29 determines in which cycle of n cycles of first angle data that occur in first determined cycle, the newly computed fifth angle data occurs. A third cycle determining section 31 determines in which cycle of N1 cycles of the first angle data, the current first angle data occurs, based on the first determined cycle and second determined cycle. An absolute position determining section 33 determines the absolute position based on third determined cycle and the digital value of the current first angle data.

3 Claims, 5 Drawing Sheets

360° (ELECTRICAL ANGLE) (360°/NUMBER OF TEETH) (MECHANICAL ANGLE)

PS15

PS16

ΔPS1512

ΔPS1615

MAGNETIC ABSOLUTE ENCODER

BACKGROUND OF THE INVENTION

1. Field of the Invention

The present invention relates to a magnetic absolute encoder that uses rotation detectors each including a gear fixed to a rotary shaft and having a predetermined number of teeth and at least one magnetic detecting element for detecting magnetic flux passing through the teeth to output an electrical signal relating to the position of the teeth.

2. Related Art

Japanese Patent Application Publication No. 11-237256 (JP11-237256A) discloses a rotation detecting device that can be utilized as a magnetic incremental encoder. Japanese Patent Application Publication No. 2008-180698 (JP2008-180698A) discloses a magnetic absolute encoder that utilizes the basic structure of a magnetic incremental encoder.

SUMMARY OF THE INVENTION

Technical Problem

With the magnetic absolute encoder according to the related art, however, it is difficult to enhance the resolution of the encoder while reducing the size of the encoder.

An object of the present invention is to provide a magnetic absolute encoder having enhanced resolution even in a reduced size.

Solution to Problem

A magnetic absolute encoder according to the present invention includes first to third rotation detectors each including a gear fixed to a rotary shaft and having a predetermined number of teeth and one or more magnetic detecting elements for detecting magnetic flux passing through the predetermined number of teeth, each capable of detecting a rotational position of the gear. More specifically, the first rotation detector includes a first gear fixed to the rotary shaft and having N1 teeth and formed from a magnetic material, a biasing magnet, and two magnetic detecting elements for detecting magnetic flux emanating from the biasing magnet and passing through the N1 teeth to output two electrical signals having a phase difference of 90° in terms of electrical angle. The second rotation detector includes a second gear fixed to the rotary shaft and having N2 teeth and formed from a magnetic material, a biasing magnet, and two magnetic detecting elements for detecting magnetic flux emanating from the biasing magnet and passing through the N2 teeth to output two electrical signals having a phase difference of 90° in terms of electrical angle. The third rotation detector includes a third gear fixed to the rotary shaft and having N3 teeth and formed from a magnetic material, a biasing magnet, and two magnetic detecting elements for detecting magnetic flux emanating from the biasing magnet and passing through the N3 teeth to output two electrical signals having a phase difference of 90° in terms of electrical angle.

The magnetic absolute encoder according to the present invention also includes: an A/D conversion section for converting the electrical signals output from each of the first to third rotation detectors into digital values and outputting first to third angle data each having a predetermined number of cycles that is equivalent to the number of the teeth of the corresponding gear, wherein one cycle is represented by a predetermined digital value; and an absolute position computing section for detecting an absolute position of the rotary shaft in one rotation, based on outputs from the A/D conversion section. More specifically, the A/D conversion section includes first to third A/D converters respectively corresponding to the first to third rotation detectors. The first A/D converter converts the two electrical signals output from the first rotation detector into a digital value of N1 bits, where M is an integer of two or more, and outputs first angle data having N1 cycles, wherein one cycle is represented by a digital value of 0 to $2^M-1$, while the rotary shaft makes one rotation. The second A/D converter converts the two electrical signals output from the second rotation detector into a digital value of M bits and outputs second angle data having N2 cycles, wherein one cycle is represented by a digital value of 0 to $2^M-1$, while the rotary shaft makes one rotation. The third A/D converter converts the two electrical signals output from the third rotation detector into a digital value of M bits and outputs third angle data having N3 cycles, wherein one cycle is represented by a digital value of 0 to $2^M-1$, while the rotary shaft makes one rotation.

N1 is an integer of m×n where m and n are each an integer of 2 or more, N2 is an integer of N1+1, and N3 is an integer of m×(n−1). When the numbers N1 to N3 of the teeth are thus defined, the absolute position computing section operates as follows. The absolute position computing section preliminarily computes fourth angle data having m cycles, wherein one cycle is represented by a predetermined digital value, based on a difference between the first angle data having N1 cycles and the third angle data having N3 cycles while the rotary shaft makes one rotation. The absolute position computing section also computes fifth angle data having one cycle, wherein one cycle is represented by a predetermined digital value, based on a difference between the first angle data having N1 cycles and the second angle data having N2 cycles while the rotary shaft makes one rotation. The absolute position computing section stores the fourth angle data and the fifth angle data as stored data. In order to determine the absolute position, the absolute position computing section operates as follows. First, the absolute position computing section determines in which cycle of the m cycles of the fourth angle data, fifth angle data, which has been newly computed in response to rotation of the rotary shaft, occurs, and then defines the thus determined cycle as a first determined cycle. Next, the absolute position computing section determines in which cycle of n cycles of the first angle data that occur in the first determined cycle, the newly computed fifth angle data occurs, and then defines the thus determined cycle as a second determined cycle. Further, the absolute position computing section determines in which cycle of the N1 cycles of the first angle data, newly output first angle data occurs, based on the first determined cycle and the second determined cycle, and then defines the thus determined cycle as a third determined cycle. Finally, the absolute position computing section determines the absolute position based on the third determined cycle and the digital value of the newly output first angle data.

According to the present invention, the fifth angle data, in which one cycle coincides with a mechanical angle of 360°, is prepared based on outputs from the first rotation detector and the second rotation detector whose number of the teeth of the gear differs from that of the first rotation detector by one. The absolute position is determined based on the fifth angle data. In the fifth angle data, one cycle is represented as a digital value of 0 to $2^M-1$ if M-bit computing means is used, which results in low resolution. Thus, the absolute position computing section determines in which cycle of the m cycles of the fourth angle data, fifth angle data, which has been newly computed in response to rotation of the rotary shaft, occurs. The thus determined cycle is defined as a first determined cycle. That is, it is determined in which cycle of the m cycles of the fourth angle data that occur in a range of or with a mechanical angle of 360°, the fifth angle data occurs, where one cycle corresponds to a mechanical angle of 360°/m. Next, the absolute position computing section determines in which cycle of n cycles of the first angle data that occur in the first determined cycle, the newly computed fifth angle data occurs, where one cycle corresponds to a mechanical angle of 360°/(m×n). The thus determined cycle is defined as a second determined cycle. Then, the absolute position computing section determines in which cycle of the N1 cycles of the first angle data, newly output first angle data occurs, based on the first determined cycle and the second determined cycle. The thus determined cycle is defined as a third determined cycle. It is determined in which cycle of the N1 cycles of the first angle data that occur for one rotation, the newly output first angle data occurs. As a result, if the third determined cycle is the N-th cycle, for and one cycle is represented by a digital value of 0 to $2^M-1$, the absolute position computing section determines the absolute position as [(digital value of (N−1)× $2^M$)+(digital value of the first angle data currently output from the first rotation detector)]. As a result, according to the present invention, the resolution may be enhanced by using three gears fixed to the rotary shaft. The present invention is also theoretically applicable to a magnetic absolute encoder having four or more gears. Practically, however, up to three gears are used inmost cases as in the present invention. While the present application does not focus on the use of four or more gears, the applicant does not renounce the use of four or more gears.

DESCRIPTION OF THE PREFERRED EMBODIMENTS

Figure 1:
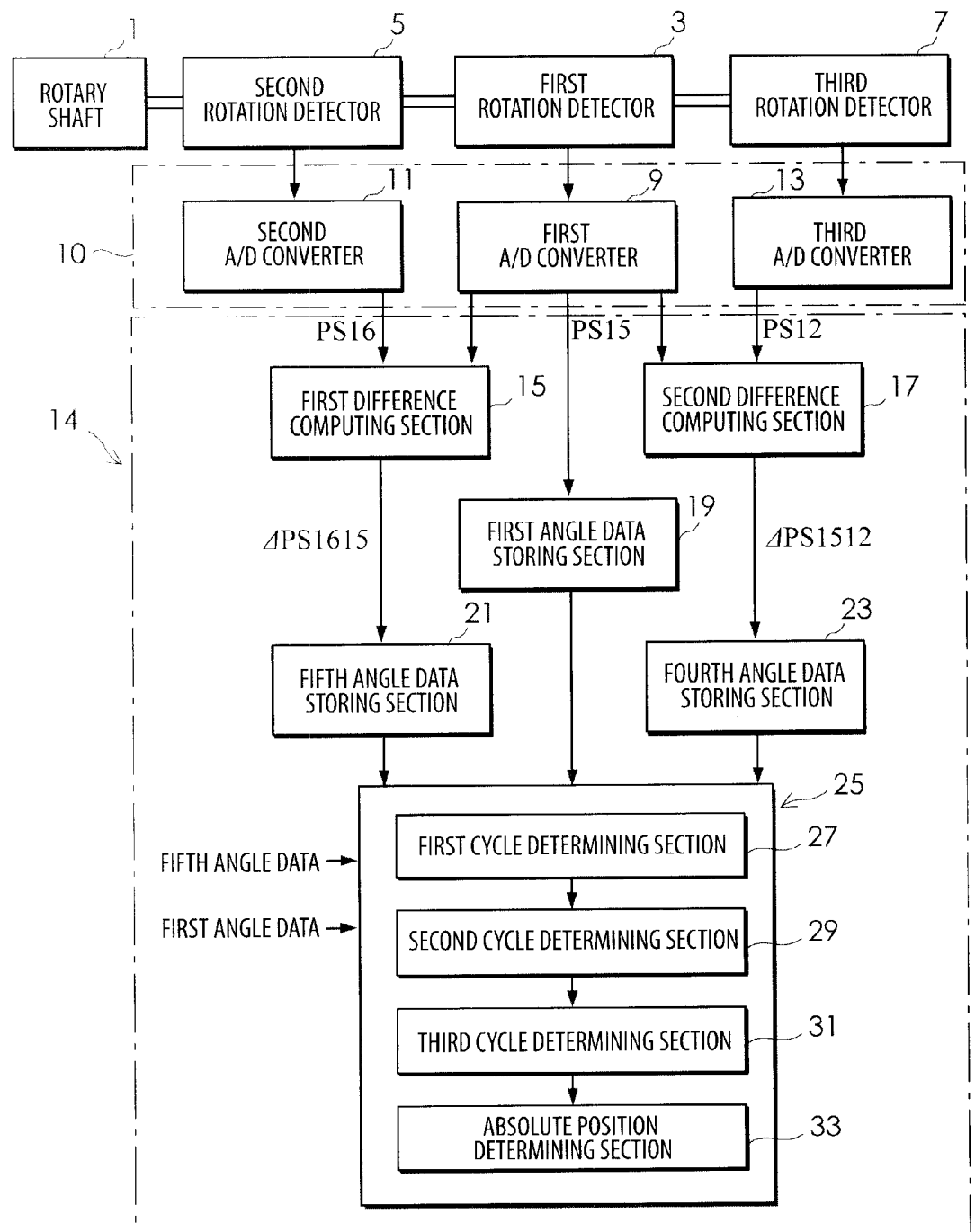
FIG. 1 is a block diagram schematically showing the configuration of an embodiment of the present invention.
Figure 2:
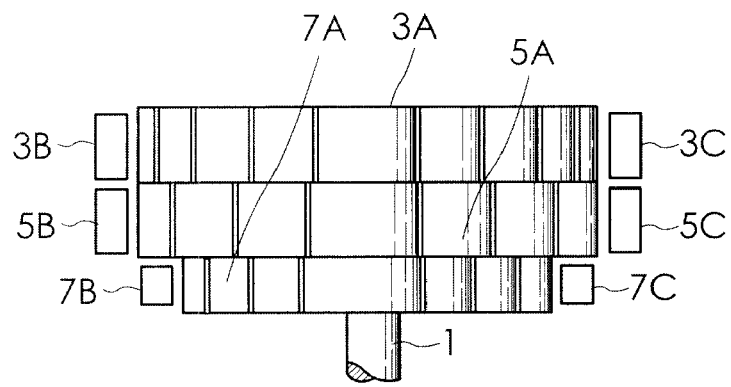
FIG. 2 shows an exemplary combination of a rotary shaft and gears.

A magnetic absolute encoder according to an embodiment of the present invention will be described in detail below with reference to the drawings. FIG. 1 is a block diagram schematically showing the configuration of an embodiment of the present invention. FIG. 2 shows an exemplary combination of a rotary shaft and gears. In FIGS. 1 and 2, reference numeral 1 denotes a rotary shaft rotated by a drive source such as a motor. First to third gears 3A, 5A, and 7A respectively forming a part of first to third rotation detectors 3 to 7 are fixed to the rotary shaft 1. The first to third gears 3A, 5A, and 7A are formed from a magnetic material such as iron, and have a plurality of teeth on their respective outer peripheral portions. In the description below, the first gear 3A has N1 teeth, the second gear 5A has N2 teeth, and the third gear 7A has N3 teeth. In the embodiment, N1 is an integer of m×n where m and n are each an integer of 2 or more, N2 is an integer of N1+1, and N3 is an integer of m×(n−1). In the embodiment described below, the following values are used for ease of understanding: N1=15, N2=16, N3=12, m=3, and n=5.

Figure 3:
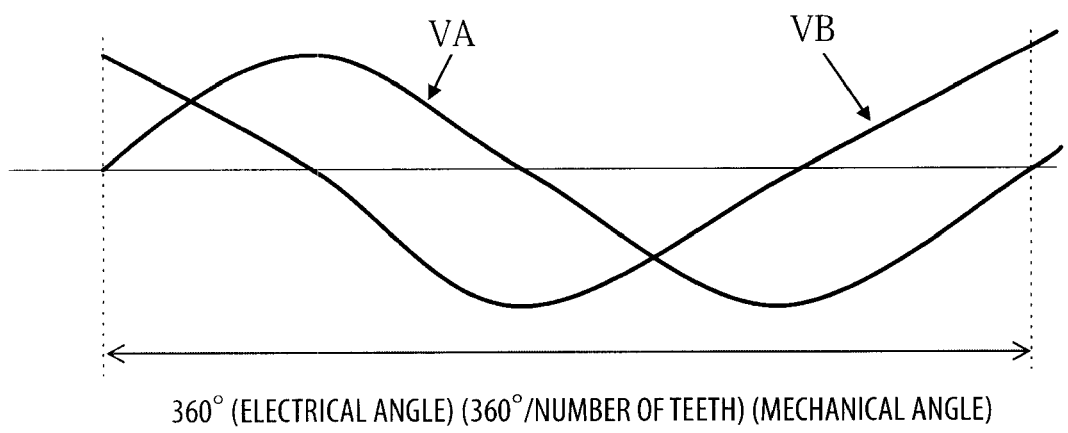
FIG. 3 shows exemplary two electrical signals output from two magnetic detecting elements and having a phase difference of 90° in terms of electrical angle.

The first to third rotation detectors 3 to 7 each include a biasing magnet, and two magnetic detecting elements 3B and 3C, 5B and 5C, and 7B and 7C, respectively, for detecting magnetic flux emanating from the biasing magnet and passing through the N1, N2, and N3 teeth, respectively, to output two electrical signals having a phase difference of 90° in terms of electrical angle. FIG. 3 shows exemplary two electrical signals output from the two magnetic detecting elements 3B and 3C, 5B and 5C, and 7B and 7C, and having a phase difference of 90° in terms of electrical angle. For example, rotation detectors that may be used as the first to third rotation detectors 3 to 7 are described in Japanese Patent Application Publication No. 2008-180698 (JP2008-180698A) mentioned above. Such known rotation detectors may be utilized as they are as the first to third rotation detectors 3 to 7.

The magnetic absolute encoder includes an A/D conversion section 10 for converting the electrical signals output from the first to third rotation detectors 3 to 7 into digital values and outputting first to third angle data each having a predetermined number of cycles which is equivalent to the number, N1 to N3, of the teeth of the corresponding gear, wherein one cycle is represented by a predetermined digital value. The A/D conversion section 10 includes first to third A/D converters 9 to 13 respectively corresponding to the first to third rotation detectors 3 to 7. The first A/D converter 9 converts the two electrical signals output from the first rotation detector 3 into a digital value of M bits, where M is an integer of two or more, and outputs first angle data having N1 cycles, wherein one cycle is represented by a digital value of 0 to $2^M-1$, while the rotary shaft 1 makes one rotation. The second A/D converter 11 converts the two electrical signals output from the second rotation detector 5 into a digital value of M1 bits and outputs second angle data having N2 cycles, wherein one cycle is represented by a digital value of 0 to $2^M-1$, while the rotary shaft 1 makes one rotation. The third A/D converter 13 converts the two electrical signals output from the third rotation detector 7 into a digital value of M bits and outputs third angle data having N3 cycles, wherein one cycle is represented by a digital value of 0 to $2^M-1$, while the rotary shaft 1 makes one rotation.

Defining N1 as 15, N2 as 16, and N3 as 12, and M=10, the first to third angle data are obtained as follows:

First, two electrical signals VA and VB shown in FIG. 3 can be represented as follows:

$$VA = k \cdot \sin(\theta)$$

$$VB = k \cdot \cos(\theta)$$

where θ is the rotational angle of the rotary shaft 1 in a range of 0° to 360°.

The value of θ is calculated from the two values as follows:

$$\begin{aligned}\theta &= \arctan(VA/VB)\\ &= \arctan(k \cdot \sin(\theta)/k \cdot \cos(\theta))\\ &= \arctan(\sin(\theta)/\cos(\theta))\end{aligned}$$

Specifically, the first to third A/D converters 9 to 13 forming the A/D conversion section 10 convert the electrical signals VA and VB respectively output from the first to third rotation detectors 3 to 7 into a 10-bit digital value of 0 to 1023.

The value of θ is calculated from the thus obtained digital value by a computing device such as a CPU. Angle data PS takes 10-bit values of θ to 1023 while the rotary shaft 1 makes one rotation, where PS=θ/360×1024.

Figure 4:
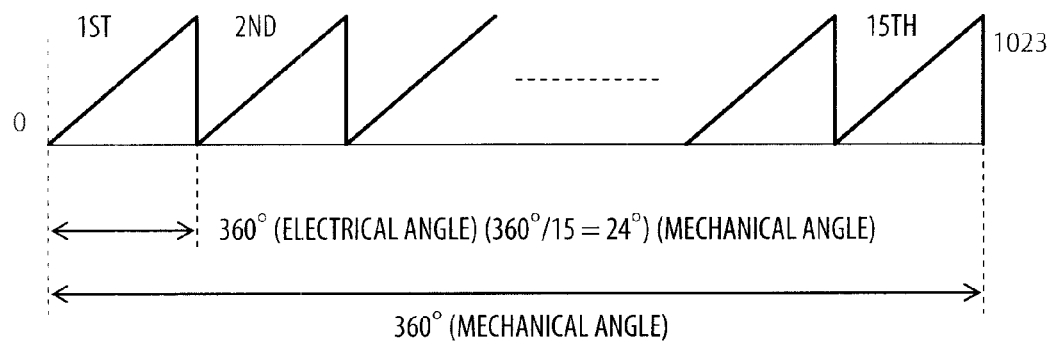
FIG. 4 shows exemplary first angle data.
Figure 5:
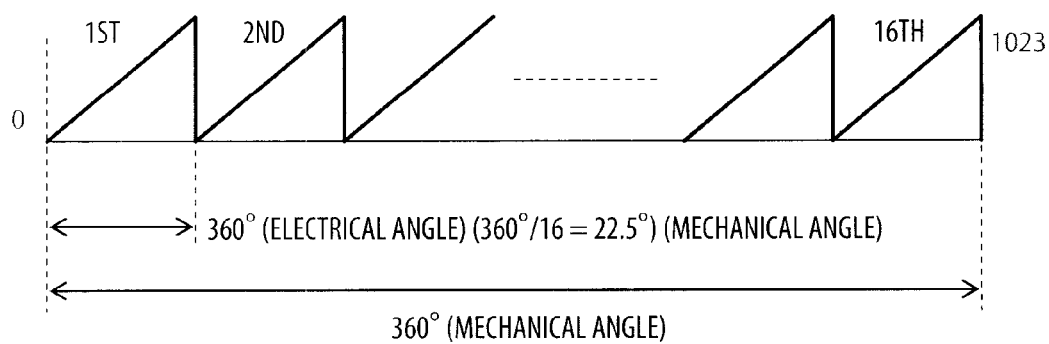
FIG. 5 shows exemplary second angle data.

First to third angle data PS15, PS16, and PS12 are respectively obtained from the first to third A/D converters 9 to 13. In each of the first angle data PS15, the second angle data PS16, and the third angle data PS12, one cycle is represented by a digital value of 0 to 1023. The first angle data PS15 occurs N1 cycles, specifically 15 cycles in the embodiment, while the gear makes one rotation, that is, in terms of a mechanical angle of 360°. This is illustrated in FIG. 4. The second angle data PS16 occurs N2 cycles, specifically 16 cycles in the embodiment, while the gear makes one rotation, that is, in terms of a mechanical angle of 360°. This is illustrated in FIG. 5. The third angle data PS12 occurs N3 cycles, specifically 12 cycles in the embodiment, while the gear makes one rotation, that is, in terms of a mechanical angle of 360°. This is illustrated in FIG. 6.

Next, an absolute position computing section 14 will be described. The absolute position computing section 14 includes a first difference computing section 15 for computing fifth angle data having one cycle, wherein one cycle is represented by a predetermined digital value specifically, $2^{10}$ in the embodiment, based on the difference between the first angle data having N1 cycles, specifically 15 cycles in the embodiment, and the second angle data having N2 cycles, specifically 16 cycles in the embodiment, while the rotary shaft 1 makes one rotation. The absolute position computing section 14 also includes a second difference computing section 17 for computing fourth angle data having m cycles, specifically 3 cycles in the embodiment, wherein one cycle is represented by a predetermined digital value, specifically $2^{10}$ in the embodiment, based on the difference between the first angle data having N1 cycles, specifically 15 cycles in the embodiment, and the third angle data having N3 cycles, specifically 12 cycles in the embodiment, while the rotary shaft 1 makes one rotation. The fourth and fifth angle data are preliminarily calculated by causing the rotary shaft 1 to make at least one rotation, and respectively stored in a fourth angle data storing section 23 and a fifth angle data storing section 21. At this time, the first angle data is also obtained and stored in a first angle data storing section 19. These data are utilized to determine the absolute position.

How the second difference computing section 17 works and the relationship between the first angle data PS15 and the third angle data PS12 will be specifically described below.

Figure 6:
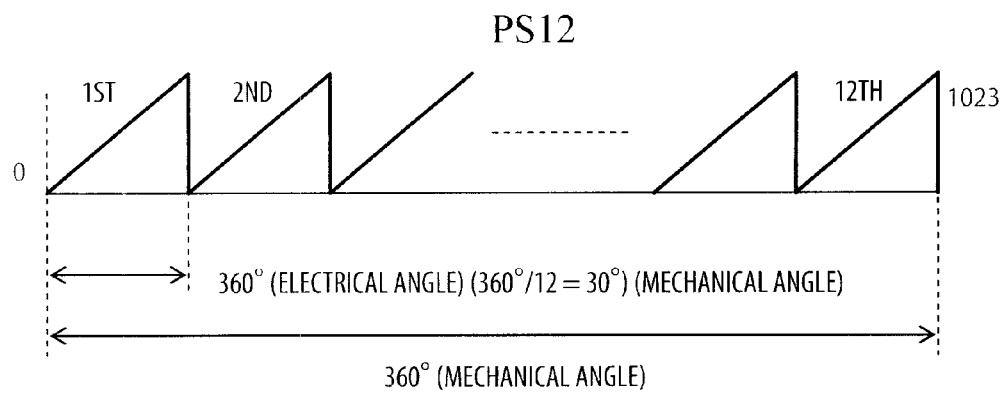
FIG. 6 shows exemplary third angle data.
Figure 7:
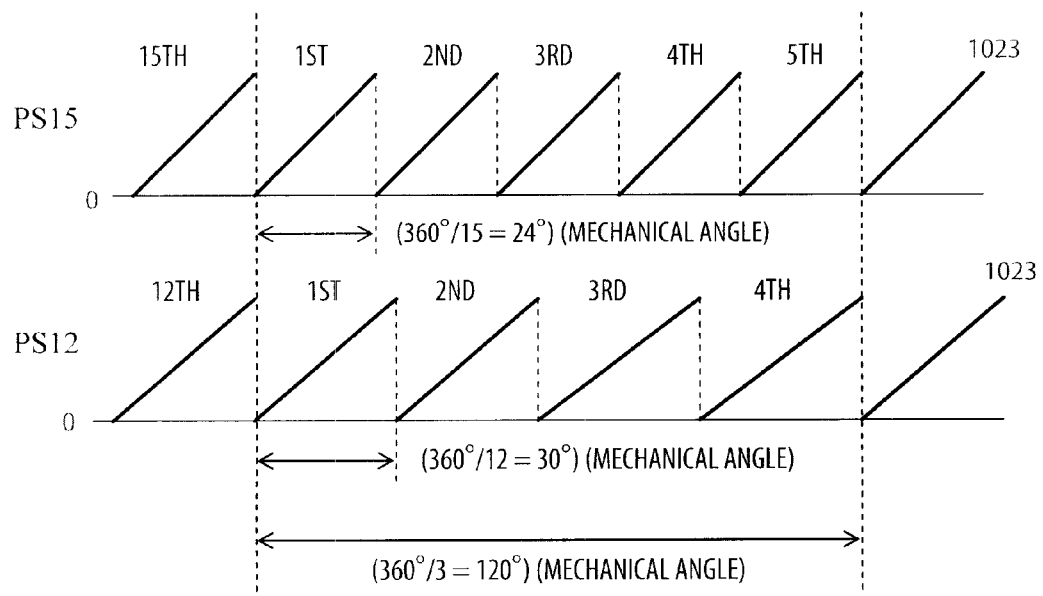
FIG. 7 shows comparison between the first angle data and the third angle data.

The first angle data PS15 shown in FIG. 4 is compared with the third angle data PS12 shown in FIG. 6. As shown in FIG. 4, the first angle data PS15 varies from 0 to 1023 15 times while the gear makes one rotation. As shown in FIG. 6, the third angle data PS12 varies from 0 to 1023 12 times while the gear makes one rotation. Here, 15=3×5, and 12=3×4, and thus the two numbers have a common divisor 3. Therefore, five occurrences of the first angle data PS15 and four occurrences of the third angle data PS12 correspond to the same mechanical angle of 360°/3=120°. FIG. 7 shows how the first angle data PS15 and the third angle data PS12 coincide with each other every 120° or for each 120°. Such coincidence occurs three times while the gears make one rotation.

In this situation, the second difference computing section 17 calculates the difference between the second angle data PS12 and the first angle data PS15 to identify the individual five triangle waves or cycles of the first angle data PS15. Here, the rotational angle θ of the rotary shaft 1 is represented by an electrical angle θe and a mechanical angle θm.

The electrical angle θe15 of the first gear 3A having 15 teeth can be represented as θe15=15×θm. Similarly, the electrical angle θe12 of the third gear 7A having 12 teeth can be represented as θe12=12×θm. Thus, the first angle data PS15 and the third angle data PS12 can be respectively represented as follows:

$$PS15 = \theta e15/360 \times 1024$$
$$= 15 \times \theta m/360 * 1024$$
$$PS12 = \theta e12/360 \times 1024$$
$$= 12 \times \theta m/360 \times 1024$$

The fourth angle data ΔPS1512 is calculated as the difference between these two angle data as follows:

$$\Delta PS1512 = PS15 - PS12$$
$$= 15 \times \theta m/360 \times 1024 - 12 \times \theta m/360 \times 1024$$
$$= 3 \times \theta m/360 \times 1024$$
$$= \theta m/120 \times 1024$$

Figure 8:
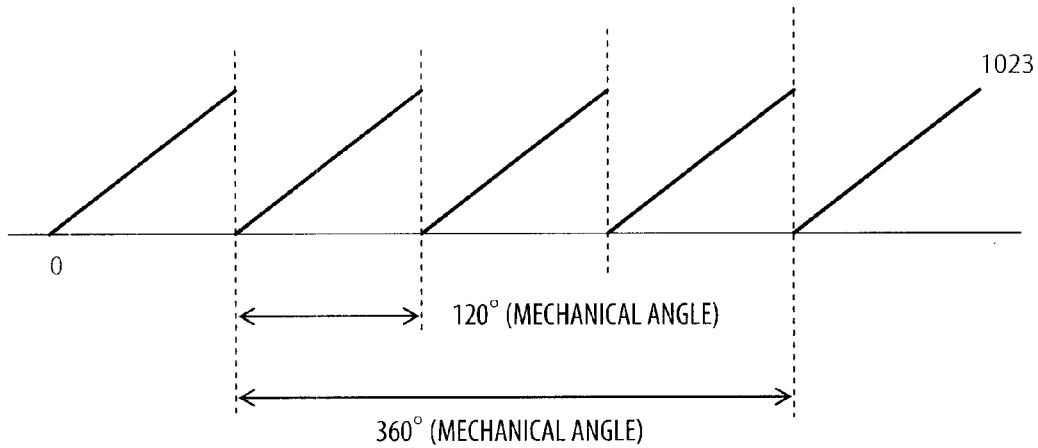
FIG. 8 shows exemplary fourth angle data.

That is, the difference between the first angle data PS15 and the third angle data PS12, namely the fourth angle data ΔPS1512, varies from 0 to 1023 each time the gears rotate by 120°, which results in three times of such variation while the gears make one rotation or rotate by 360°. This is illustrated in FIG. 8. The fourth angle data ΔPS1512 is stored in the fourth angle data storing section 23.

Next, how the first difference computing section 15 works will be described. The electrical angle θe15 of the first gear 3A having 15 teeth can be represented as θe15=15×θm. Then, the first angle data PS15 is represented as PS15=θe15/360×1024=15×θm/360×1024. Similarly, the electrical angle θe16 of the second gear 5A having 16 teeth can be represented as θe16=16×θm. Then, the second angle data PS16 is represented as PS16=0e16/360×1024=16×θm/360×1024.

The first difference computing section 15 calculates the difference PS16-PS15 between the first angle data PS15 and the second angle data PS16 as follows:

$$PS16 - PS15 = 16 \times \theta m/360 \times 1024 - 15 \times \theta m/360 \times 1024$$
$$= 1 \times \theta m/360 \times 1024$$
$$= \theta m/360 \times 1024$$

Figure 9:
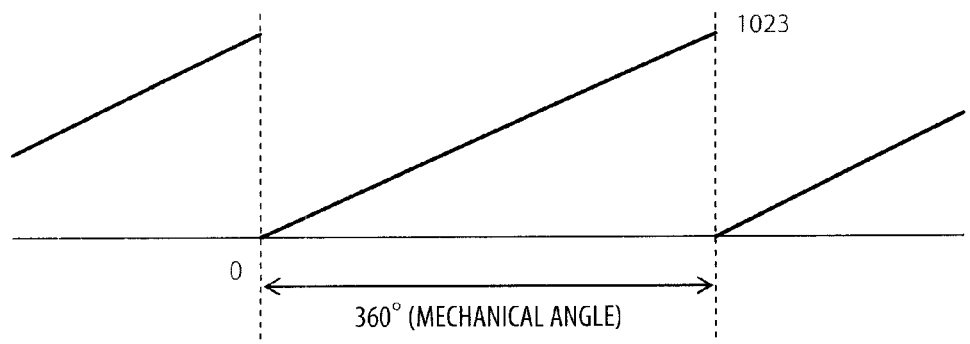
FIG. 9 shows exemplary fifth angle data.

The difference between the second angle data PS16 and the first angle data PS15, namely the fifth angle data ΔPS1615 (PS16-PS15), varies from 0 to 1023 in terms of digital value each time the gears rotate by 360°, which results in one such variation while the gears make one rotation or rotate by 360°. This is illustrated in FIG. 9. The fifth angle data ΔPS1615 is stored in the fifth angle data storing section 21.

The absolute position computing section 14 includes determining means 25. The determining means 25 includes a first cycle determining section 27, a second cycle determining section 29, a third cycle determining section 31, and an absolute position determining section 33. The first cycle determining section 27 determines in which cycle of the m cycles of the fourth angle data stored in the fourth angle data storing section 23, fifth angle data ΔPS1615' (current fifth angle data), which has been newly computed in response to rotation of the rotary shaft 1, occurs and then defines the thus determined cycle as a first determined cycle.

The starting point and ending point of one triangle wave indicating the fifth angle data ΔPS1615 shown in FIG. 9 respectively coincide with the starting point of the first triangle wave and the ending point of the third triangle wave of three triangle waves indicating the fourth angle data ΔPS1512 shown in FIG. 8. An angle formed between these starting and ending points is a mechanical angle of 360°. Thus, the first cycle determining section 27 can determine which triangle wave is what number triangle wave, the first, second, or third, of the fourth angle data ΔPS1512 based on a digital value obtained by dividing the value of the fifth angle data ΔPS1615 by three. That is, 1024/3=341.3. Thus, if the digital value obtained from the fifth angle data ΔPS1615 is from 0 to 341, it is determined as the first triangle wave or cycle of the fourth angle data ΔPS1512. If the digital value obtained from the fifth angle data ΔPS1615 is from 342 to 682, it is determined as the second triangle wave or cycle of the fourth angle data ΔPS1512. If the digital value obtained from the fifth angle data ΔPS1615 is from 683 to 1023, it is determined as the third triangle wave or cycle of the fourth angle data ΔPS1512. The first cycle determining section 27 determines in which triangle wave or cycle of the m triangle waves or cycles, specifically three cycles shown in FIG. 8, of the fourth angle data ΔPS1512 that occur in the one cycle of the fifth angle data ΔPS1615, the newly computed fifth angle data ΔPS1615' (current fifth angle data) occurs, and defines the thus determined cycle as a first determined cycle.

As seen by comparing the respective waveforms shown in FIGS. 7 and 8, the starting point and ending point of one triangle wave of the fourth angle data ΔPS1512 shown in FIG. 8 respectively coincides with the starting point of the first triangle wave and the ending point of the fifth triangle wave of the five triangle waves, or the fifth cycle corresponding the fifth tooth, of the first angle data PS15 shown in FIG. 7. An angle formed between these starting and ending points is a mechanical angle of 120°. Thus, the second cycle determining section 29 can determine which triangle wave or cycle of the five triangle waves or cycles of the first angle data PS15 is what number triangle wave or cycle, the first, second, third, forth, or fifth, based on a digital value obtained by dividing the value of the one triangle waver or cycle of the fourth angle data ΔPS1512 by five. That is, 1024/5=204.8. Thus, if the digital value obtained from the fourth angle data ΔPS1512 is from 0 to 204, it is determined as the first triangle wave or cycle corresponding to the first tooth of the first angle data PS15. If the digital value obtained from the fourth angle data ΔPS1512 is from 205 to 409, it is determined as the second triangle wave or cycle corresponding to the second tooth of the first angle data PS15. If the digital value obtained from the fourth angle data ΔPS1512 is from 410 to 614, it is determined as the third triangle or cycle corresponding to the third tooth of the first angle data PS15. If the digital value obtained from the fourth angle data ΔPS1512 is from 615 to 819, it is determined as the fourth triangle waver, or cycle corresponding to the fourth tooth of the first angle data PS15. If the digital value obtained from the fourth angle data ΔPS1512 is from 820 to 1023, it is determined as the fifth triangle waver or cycle corresponding to the fifth tooth of the first angle data PS15. In this way, the second cycle determining section 29 determines in which triangle wave or cycle of then triangle waves or cycles, specifically five triangle waves or cycles from the first to the fifth shown in FIG. 7, of the first angle data PS15 that occur in the first determined cycle, that is, one triangle wave or cycle of the three triangle waves or cycles shown in FIG. 8, the newly computed fifth angle data ΔPS1615' (current data) occurs, and then defines the thus determined cycle as a second determined cycle.

The third cycle determining section 31 determines in which cycle of the N1 cycles, 15 cycles from the first to the $15^{th}$, of the first angle data PS15, first angle data PS15' newly output from the first A/D converter 9 occurs, based on the first determined cycle determined by the first cycle determining section 27 and the second determined cycle determined by the second cycle determining section 29, and defines the thus determined cycle as a third determined cycle. Finally, the absolute position determining section 33 determines the absolute position in one rotation, based on the third determined cycle, that is, information indicating which cycle of the N1 cycles, 15 cycles from the first to the 15th, and the digital value of the first angle data P515' currently output from the first A/D converter 9.

Hereinbelow, the embodiment will be described more generally. The first difference computing section 15 prepares fifth angle data, in which one cycle coincides with a mechanical angle of 360°, based on values respectively obtained by the first and second A/D converters 9 and 11 by A/D-converting outputs from the first rotation detector 3 and the second rotation detector 5 whose number of the teeth of the gear differs from that of the first rotation detector 3 by one. The absolute position is determined based on the fifth angle data. In the fifth angle data, one cycle is represented as a digital value of 0 to $2^M-1$ if M-bit computing means is used. The first cycle determining section 27 utilizes data stored in the fourth angle data storing section 23 to determine in which cycle of the m cycles of the fourth angle data, fifth angle data, which has been newly computed in response to rotation of the rotary shaft 1, occurs. The thus determined cycle is defined as a first determined cycle. That is, it is determined in which cycle of the m cycles (one cycle corresponds to a mechanical angle of 360°/m) of the fourth angle data that occur in a range of or within a mechanical angle of 360°, the fifth angle data occurs. Next, the second cycle determining section 29 determines in which cycle of the n cycles [one cycle corresponds to a mechanical angle of 360°/(m×n)] of the first angle data that occur in the first determined cycle, the newly computed fifth angle data occurs. The thus determined cycle is defined as a second determined cycle. Then, the third cycle determining section 31 determines in which cycle of the N1 cycles of the first angle data, the current first angle data occurs, based on the first determined cycle and the second determined cycle. The thus determined cycle is defined as a third determined cycle. Finally, if the third determined cycle is the N-th cycle, for example, and one cycle is represented by a digital value of 0 to $2^M-1$, the absolute position determining section 33 determines the absolute position as [(digital value of $(N-1)\times 2^M$)+ (digital value of the first angle data currently output from the first rotation detector)].

The numbers of teeth used in the above embodiment are used for ease of understanding, and various combinations of the numbers of teeth for the first to third gears, such as N1=384, N2=385, and N3=368, for example, may be practically used. The numbers 384 and 385 are prime numbers that differ from each other by one, and thus the 384 teeth can be identified or determined as what number teeth, from the first to 384th, by calculating the difference between respective angle data for the two numbers. From 384=24×16 and 368=23×16, the two numbers have a common divisor 16. That is, the ending points of the 24th triangle wave occurring when the first gear rotates by an amount corresponding to 24 teeth coincides with the ending points of the 23th triangle wave occurring when the third gear rotates by an amount corresponding to 23 teeth at 0 or zero point. Here, the term "0 or zero point" means a point at which the amplitude of the triangle wave becomes zero. Such coincidence occurs 16 times while the gears make one rotation. Thus, the 24 teeth can be identified or determined as what number tooth, from the first to 24th, by calculating the difference between the respective output values of the first gear and the third gear. Next, whether or not such coincidence occurs 16 times may be determined by comparing one triangle wave as the difference between the respective angle data for the first gear and the second gear with 16 triangle waves as the difference between the respective angle data for the first gear and the third gear.

While three gears are used in the embodiment, the present invention is also theoretically applicable to a magnetic absolute encoder having four gears. In this case, the respective numbers N1 to N4 of the teeth of the first to fourth gears are determined as follows:

N1, the number of teeth for the first gear: $N1 = m1 \times m2 \times n$
  (where m1, m2, and n are each an integer of 2 or more)
N2, the number of teeth for the second gear: $N2 = N1+1$ N3, the number of teeth for the third gear:
  $N3 = m1 \times m2 \times (n-1)$
N4, the number of teeth for the fourth gear: $N4 = m1 \times ((m2 \times n) - 1)$ The numbers N1 and N2 are prime numbers that differ from each other by one, and thus the N1 teeth can be identified or determined as what number tooth, from the first to N1-th, by calculating the difference between respective angle data for the two numbers of teeth of gears. An electrical angle of 360°/N1 is required, thereby making machining harder and increasing the burden on electrical circuitry.

Here, $$N1 = m1 \times m2 \times n, \text{ and}$$

$$N3 = m1 \times m2 \times (n-1).$$

The two numbers have a common divisor (m1×m2).

That is, the ending point of the n-th triangle wave occurring when the first gear rotates by an amount corresponding to (n) teeth coincides with the ending point of the (n−1)-th triangle wave occurring when the third gear rotates by an amount corresponding to (n−1) teeth. Such coincidence occurs (m1×m2) times while the gears make one rotation.

Thus, the n teeth can be identified or determined as what number tooth, from the first to n-th, by calculating the difference between the respective output values of the first gear and the third gear. At this time, a required accuracy is an electrical angle of 360°/(n).

Here, $$N1 = m1 \times m2 \times n, \text{ and}$$

$$N4 = m1 \times ((m2 \times n) - 1).$$

The two numbers have a common divisor (m1).

That is, the ending point of the (m2×n)-th triangle wave occurring when the first gear rotates by an amount corresponding to (m2×n) teeth coincides with the ending point of the (m2×n−1)-th triangle wave occurring when the fourth gear rotates by an amount corresponding to ((m2×n)−1) teeth. Such coincidence occurs (m1) times while the gears make one rotation.

Thus, the difference, that is (m1) triangle waves, between the respective output values of the first gear and the fourth gear is calculated, and then compared with a calculated value of the difference, (m1×m2) triangle waves, between the respective output values of the first gear and the third gear. Thus, the m2 (2, 3, . . . , m2) triangle waves can be identified or determined in the (m1) triangle waves. At this time, a required accuracy is an electrical angle of 360°/(m2).

Further, whether or not such coincidence occurs (m1) times can be identified or determined by comparing one triangle wave as the difference between the respective angle data of the first gear and the second gear with (m1) triangle waves as the difference between the respective angle data of the first gear and the fourth gear. At this time, a required accuracy is an electrical angel of 360°/(m1).

Next, a generalized example will be described. Here, it is assumed that s gears are provided.

The number N1 of the teeth of the first gear can be represented as follows:

$$N1 = m1 \times m2 \times \ldots \times m(s-2) \times n$$

(where m1, m2, . . . , m(s−2), and n are each an integer of 2 or more)

The number N2 of the teeth of the second gear can be represented as follows:

$$N2 \text{ for the second gear: } N2 = N1+1$$

The number N3 of the teeth of the third gear is represented as follows:

$$N3 = m1 \times m2 \times \ldots \times m(s-2) \times (n-1)$$

The number N4 of the teeth of the fourth gear is represented as follows:

$$N4 = m1 \times m2 \times \ldots \times m(s-3) \times ((m(s-2) \times n) - 1)$$

$$\vdots$$

The number Nk of the teeth of the K-th gear is represented as follows:

$$Nk = m1 \times m2 \times \ldots \times m(s-k+1) \times$$
$$(m(s-k+2) \times m(s-k+3) \times \ldots \times m(s-3) \times m(s-2) \times n - 1)$$

$$\vdots$$

The number Ns of the teeth of the s-th gear is represented as follows:

$$Ns = m1 \times (m2 \times m3 \times \ldots \times m(s-3) \times m(s-2) \times n - 1)$$

The numbers N1 and N2 are prime numbers that differ from each other by one. Thus, the N1 teeth can be identified or determined as what number tooth, from the first to the N1-th, by calculating the difference between respective angle data for the two numbers of teeth.

Here, $$N1 = m1 \times m2 \times \ldots \times m(s-2) \times n, \text{ and}$$

$$N3 = m1 \times m2 \times \ldots \times m(s-2) x(n-1).$$

The two numbers have a common divisor (m1×m2× . . . ×m(s−2)).

That is, the ending point of a triangle wave occurring when the first gear rotates by an amount corresponding to (n) teeth coincides with the ending point of a triangle wave occurring when the third gear rotates by an amount corresponding to (n−1) teeth. Such coincidence occurs (m1×m2× . . . ×m(s−2)) times while the gears make one rotation.

Thus, the (n) teeth can be identified or determined as what number tooth, from the first to the n-th, by calculating the difference between the respective output values of the first gear and the third gear. At this time, a required accuracy is an electrical angle of 360°/(n).

Here, $N1 = m1 \times m2 \times \ldots \times m(s-3) \times m(s-2) \times n$, and $N4 = m1 \times m2 \times \ldots \times m(s-3) \times ((m(s-2) \times n)-1)$.

The two numbers have a common divisor ($m1 \times m2 \times \ldots \times m(s-3)$).

That is, the ending point of a triangle wave occurring when the first gear rotates by an amount corresponding to ($m(s-2) \times n$) teeth coincides with the ending point of a triangle wave occurring when the fourth gear rotates by an amount corresponding to ($(m(s-2) \times n)-1$) teeth. Such coincidence occurs ($m1 \times m2 \times \ldots \times m(s-3)$) times while the gears make one rotation.

Thus, the difference, ($m1 \times m2 \times \ldots \times m(s-3)$) triangle waves, between the respective output values of the first gear and the fourth gear is calculated, and then compared with a calculated value of the difference ($m1 \times m2 \times \ldots \times m(s-3) \times m(s-2)$) triangle waves, between the respective output values of the first gear and the third gear. Thus, the $m(s-2)$ ($2, 3, \ldots m(s-2)$) triangle waves can be identified or determines in the ($m1 \times m2 \times \ldots \times m(s-3)$) triangle waves. At this time, a required accuracy is an electrical angle of $360°/(m(s-2))$.

Further, $N1 = m1 \times m2 \times \ldots \times m(s-3) \times m(s-2) \times n$, and $Nk = m1 \times m2 \times \ldots \times m(s-k+1) \times (m(s-k+2) \times m(s-k+3) \times \ldots \times m(s-3) \times m(s-2) \times n - 1)$.

The two numbers have a common divisor ($m1 \times m2 \times \ldots \times m(s-k+1)$).

That is, the ending point of a triangle wave occurring when the first gear rotates by an amount corresponding to ($m(s-k+2) \times m(s-k+3) \times \ldots \times m(s-3) \times m(s-2) \times n$) teeth coincides with the ending point of a triangle wave occurring when the k-th gear rotates by an amount corresponding to ($m(s-k+2) \times m(s-k+3) \times \ldots \times m(s-3) \times m(s-2) \times n - 1$) teeth. Such coincidence occurs ($m1 \times m2 \times \ldots \times m(s-k+1)$) times while the gears make one rotation.

Thus, the difference, ($m1 \times m2 \times \ldots \times m(s-k+1)$) triangle waves, between the respective output values of the first gear and the k-th gear is calculated, and then compared with a calculated value of the difference ($m1 \times m2 \times \ldots \times m(s-k+1) \times m(s-k+2)$) 9 triangle waves, between the respective output values of the first gear and the (k−1)-th gear. Thus, the $m(s-k+2)$ ($2, 3, \ldots, m(s-k+2)$) triangle waves can be identified or determined in the ($m1 \times m2 \times \ldots \times m(s-k+1)$) triangle waves. At this time, a required accuracy is an electrical angle of $360°/m(s-k+2)$.

Finally, whether or not such coincidence occurs (m1) times can be determined by comparing the one triangle wave as the difference between the respective angle data for the first gear and the second gear with the (m1)) triangle waves as the difference between the respective angle data for the first gear and the s-th gear. At this time, a required accuracy is an electrical angle of $360°/(m1)$.

According to the embodiment, a batteryless single-rotation absolute encoder may be provided.

INDUSTRIAL APPLICABILITY

According to the present invention, a magnetic absolute encoder having enhanced resolution even in a reduced size can be provided.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A magnetic absolute encoder comprising:
    first to third rotation detectors each including a gear fixed to a rotary shaft and having a predetermined number of teeth and one or more magnetic detecting elements for detecting magnetic flux passing through the predetermined number of teeth, each capable of detecting a rotational position of the gear, the gears of the first to third rotation detectors respectively having N1 to N3 teeth, N1 being an integer of m×n where m and n are each an integer of 2 or more, N2 being an integer of N1+1, and N3 being an integer of m×(n−1);
    an A/D conversion section for converting an electrical signal output from each of the first to third rotation detectors into a digital value and outputting first to third angle data each having a predetermined number of cycles which is equivalent to the number of the teeth of the corresponding gear, wherein one cycle is represented by a predetermined digital value; and
    an absolute position computing section for detecting an absolute position of the rotary shaft in one rotation, based on outputs from the A/D conversion section, by:
        preliminarily computing fourth angle data having m cycles, wherein one cycle is represented by a predetermined digital value, based on a difference between the first angle data having N1 cycles and the third angle data having N3 cycles while the rotary shaft makes one rotation, and also computing fifth angle data having one cycle, wherein one cycle is represented by a predetermined digital value, based on a difference between the first angle data having N1 cycles and the second angle data having N2 cycles while the rotary shaft makes one rotation, and then storing the fourth angle data and the fifth angle data;
        determining in which cycle of the m cycles of the fourth angle data, newly computed fifth angle data occurs and defining the thus determined cycle as a first determined cycle, and then determining in which cycle of n cycles of the first angle data that occur in the first determined cycle, the newly computed fifth angle data occurs and defining the thus determined cycle as a second determined cycle;
        determining in which cycle of the N1 cycles of the first angle data, newly output first angle data occurs based on the first determined cycle and the second determined cycle, and defining the thus determined cycle as a third determined cycle; and
        determining the absolute position based on the third determined cycle and the digital value of the newly output first angle data.

2. The magnetic absolute encoder according to claim 1, wherein
    the rotation detectors each include the gear having a predetermined number of teeth and formed from a magnetic material, a biasing magnet, and two magnetic detecting elements for detecting magnetic flux emanating from the biasing magnet and passing through the predetermined number of teeth to output two electrical signals having a phase difference of 90° in terms of electrical angle.

3. A magnetic absolute encoder comprising:

a first rotation detector including a first gear fixed to a rotary shaft and having N1 teeth and formed from a magnetic material, N1 being an integer of m×n where m and n are each an integer of 2 or more, a biasing magnet, and two magnetic detecting elements for detecting magnetic flux emanating from the biasing magnet and passing through the N1 teeth to output two electrical signals having a phase difference of 90° in terms of electrical angle;

a second rotation detector including a second gear fixed to the rotary shaft and having N2 teeth and formed from a magnetic material, N2 being an integer of N1+1, a biasing magnet, and two magnetic detecting elements for detecting magnetic flux emanating from the biasing magnet and passing through the N2 teeth to output two electrical signals having a phase difference of 90° in terms of electrical angle;

a third rotation detector including a third gear fixed to the rotary shaft and having N3 teeth and formed from a magnetic material, N3 being an integer of m×(n−1), a biasing magnet, and two magnetic detecting elements for detecting magnetic flux emanating from the biasing magnet and passing through the N3 teeth to output two electrical signals having a phase difference of 90° in terms of electrical angle;

a first A/D converter for converting the two electrical signals output from the first rotation detector into a digital value of M bits, where M is an integer of two or more, to output first angle data having N1 cycles, wherein one cycle is represented by a digital value of 0 to $2^M-1$, while the rotary shaft makes one rotation;

a second A/D converter for converting the two electrical signals output from the second rotation detector into a digital value of M bits to output second angle data having N2 cycles, wherein one cycle is represented by a digital value of 0 to $2^M-1$, while the rotary shaft makes one rotation;

a third A/D converter for converting the two electrical signals output from the third rotation detector into a digital value of M bits to output third angle data having N3 cycles, wherein one cycle is represented by a digital value of 0 to $2^M-1$, while the rotary shaft makes one rotation; and an absolute position computing section for detecting an absolute position of the rotary shaft in one rotation, based on outputs from the first to third A/D converters, by:

preliminarily computing fourth angle data having m cycles, wherein one cycle is represented by a digital value of 0 to $2^M-1$, based on a difference between the first angle data having N1 cycles and the third angle data having N3 cycles, while the rotary shaft makes one rotation; and also computing fifth angle data having one cycle, wherein one cycle is represented by a digital value of 0 to $2^M-1$, based on a difference between the first angle data having N1 cycles and the second angle data having N2 cycles, while the rotary shaft makes one rotation; and then storing the fourth angle data and the fifth angle data as stored data;

determining in which cycle of the m cycles of the fourth angle data, newly computed fifth angle data occurs by utilizing the stored data, and defining the thus determined cycle as a first determined cycle; and then determining in which cycle of n cycles of the first angle data that occur in the first determined cycle, the newly computed fifth angle data occurs by utilizing the stored data, and defining the thus determined cycle as a second determined cycle;

determining in which cycle of the N1 cycles of the first angle data, newly output first angle data occurs based on the first determined cycle and the second determined cycle, and defining the thus determined cycle as a third determined cycle; and determining the absolute position based on the third determined cycle and the digital value of the newly output first angle data.

\* \* \* \* \*